US012591484B2

(12) United States Patent
Strange et al.

(10) Patent No.: US 12,591,484 B2
(45) Date of Patent: Mar. 31, 2026

(54) TRACKING MEMORY DEFECTS USING A SHARED MEMORY DEFECT LIST

(71) Applicant: Microsoft Technology Licensing, LLC, Redmond, WA (US)

(72) Inventors: John Aaron Strange, Everett, WA (US); Christina Margaret Tobias, Hoboken, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 18/610,718

(22) Filed: Mar. 20, 2024

(65) Prior Publication Data

US 2025/0298692 A1 Sep. 25, 2025

(51) Int. Cl.
| | |
|---|---|
| *G06F 11/00* | (2006.01) |
| *G06F 11/10* | (2006.01) |
| *G06F 13/16* | (2006.01) |

(52) U.S. Cl.
CPC ...... *G06F 11/1068* (2013.01); *G06F 11/1016* (2013.01); *G06F 13/1673* (2013.01)

(58) Field of Classification Search
CPC ...... G06F 11/00; G06F 11/1068; G06F 12/16; G06F 13/1673; G06F 13/16; G06F 11/1016
See application file for complete search history.

(56) References Cited

U.S. PATENT DOCUMENTS

| | | | | |
|---|---|---|---|---|
| 7,916,594 B2 * | 3/2011 | Yang | .................. | G11B 20/1883 |
| | | | | 369/53.16 |
| 8,595,573 B2 * | 11/2013 | Shalvi | ................. | G06F 11/1008 |
| | | | | 714/763 |
| 8,854,758 B2 * | 10/2014 | Allen | ................. | G11B 20/1833 |
| | | | | 360/77.02 |

(Continued)

FOREIGN PATENT DOCUMENTS

| | | |
|---|---|---|
| CN | 115421984 A | 12/2022 |
| CN | 115827367 A | 3/2023 |
| CN | 116225756 A | 6/2023 |

OTHER PUBLICATIONS

Communication pursuant to Rule 69 EPC—reminder concerning payment of the designation fee (Art. 79(2) EPC) and of the examination fee (Art. 94(1) EPC)—and invitation pursuant to Rule 70a(1) Received for European Application No. 25163447.3, mailed on Sep. 29, 2025, 02 pages.

(Continued)

*Primary Examiner* — Esaw T Abraham

(74) *Attorney, Agent, or Firm* — Workman Nydegger

(57) ABSTRACT

Disclosed embodiments include systems and methods for tracking defective memory using a shared memory defect list. Embodiments include firmware that identifies a memory buffer to store a list that includes an entry identifying a portion of memory as defective. The firmware sends an identification of the memory buffer to an operating system. The operating system reads the list from the memory and identifies the portion of defective memory based on the list.

(Continued)

The operating system further manages memory locations used based on the identified portion of defective memory and avoids using the portion of defective memory. The firmware persists the contents of the memory to a non-volatile storage prior to shutting down the computer system.

20 Claims, 5 Drawing Sheets

(56)                    References Cited

U.S. PATENT DOCUMENTS

| | | | | |
|---|---|---|---|---|
| 9,269,457 | B2 * | 2/2016 | Kim | ........................ G11C 29/78 |
| 10,838,737 | B1 | 11/2020 | Rao | |
| 2008/0071981 | A1 * | 3/2008 | Hung | ................. G11B 20/1883 |
| | | | | 711/112 |
| 2010/0017629 | A1 | 1/2010 | Murakami et al. | |
| 2013/0151890 | A1 | 6/2013 | Cooper | |
| 2015/0255176 | A1 * | 9/2015 | Hyder | ................ G11C 29/4401 |
| | | | | 714/723 |
| 2015/0363309 | A1 * | 12/2015 | Lai | ......................... G11C 29/44 |
| | | | | 711/103 |
| 2022/0027229 | A1 | 1/2022 | Chao | |
| 2022/0229781 | A1 | 7/2022 | Stumpf et al. | |
| 2022/0318093 | A1 | 10/2022 | Bulusu et al. | |
| 2023/0195568 | A1 | 6/2023 | Hong | |

OTHER PUBLICATIONS

Extended European search report received for European Application No. 25163447.3, mailed on Aug. 21, 2025, 13 pages.

* cited by examiner

TRACKING MEMORY DEFECTS USING A SHARED MEMORY DEFECT LIST

BACKGROUND

Electronic devices, such as computers and mobile devices, rely on memory, such as dynamic random-access memory (DRAM), to store and retrieve data. Memory errors can occur for various reasons, including electrical noise, environmental conditions, manufacturing defects, and age-related wear and tear. These errors can be transient, such as soft errors caused by interference such as cosmic rays or alpha particles, or they can be permanent, such as hard errors resulting from physical defects in, or damage to, the memory cells. Memory errors can lead to data corruption, system crashes, and overall system unreliability.

Some hardware-based techniques seek to protect computing systems against memory errors. For example, error detection and correction codes, such as parity bits, cyclic redundancy checks, and error-correcting codes (ECC), have been used to detect and address memory errors at the hardware level. While some of these features, such as ECC, can correct errors once they are detected, they do not prevent errors from occurring in the first place.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products relating to a system firmware, including: identifying a memory buffer at which to store a list, wherein the list includes an entry identifying a first portion of memory that is defective; sending an identification of the memory buffer to an operating system of the computer system; and prior to shutting down the computer system, persisting contents of the memory buffer to a non-volatile storage.

In some aspects, the techniques described herein relate to methods, systems, and computer program products relating to an operating system (OS), including: identifying information associated with a memory buffer, wherein the information includes a base address of the memory buffer and a size of the memory buffer; reading a list from the memory, wherein each entry on the list identifies a location of a portion of defective memory within the memory; identifying the portion of defective memory based on the list; and managing memory locations used by the operating system based on the identified portion of defective memory, including avoiding use of the portion of defective memory.

In some aspects, the techniques described herein relate to methods, systems, and computer program products, including, at a system firmware: identifying a memory buffer at which to store a list, wherein the list includes an entry identifying a particular portion of the memory as defective; sending an identification of the memory buffer to an operating system of the computer system; and prior to shutting down the computer system, persisting contents of the memory buffer to a non-volatile storage; and, at an OS: identifying information associated with the memory buffer, wherein the information includes a base address of the memory buffer and a size of the memory buffer; reading the list from the memory, wherein each entry on the list identifies a different portion of the memory as defective; identifying the particular portion of memory as defective based on the list; and managing memory locations used by the operating system based on the identified portion of defective memory, including avoiding use of the particular portion of memory.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

Figure 1:
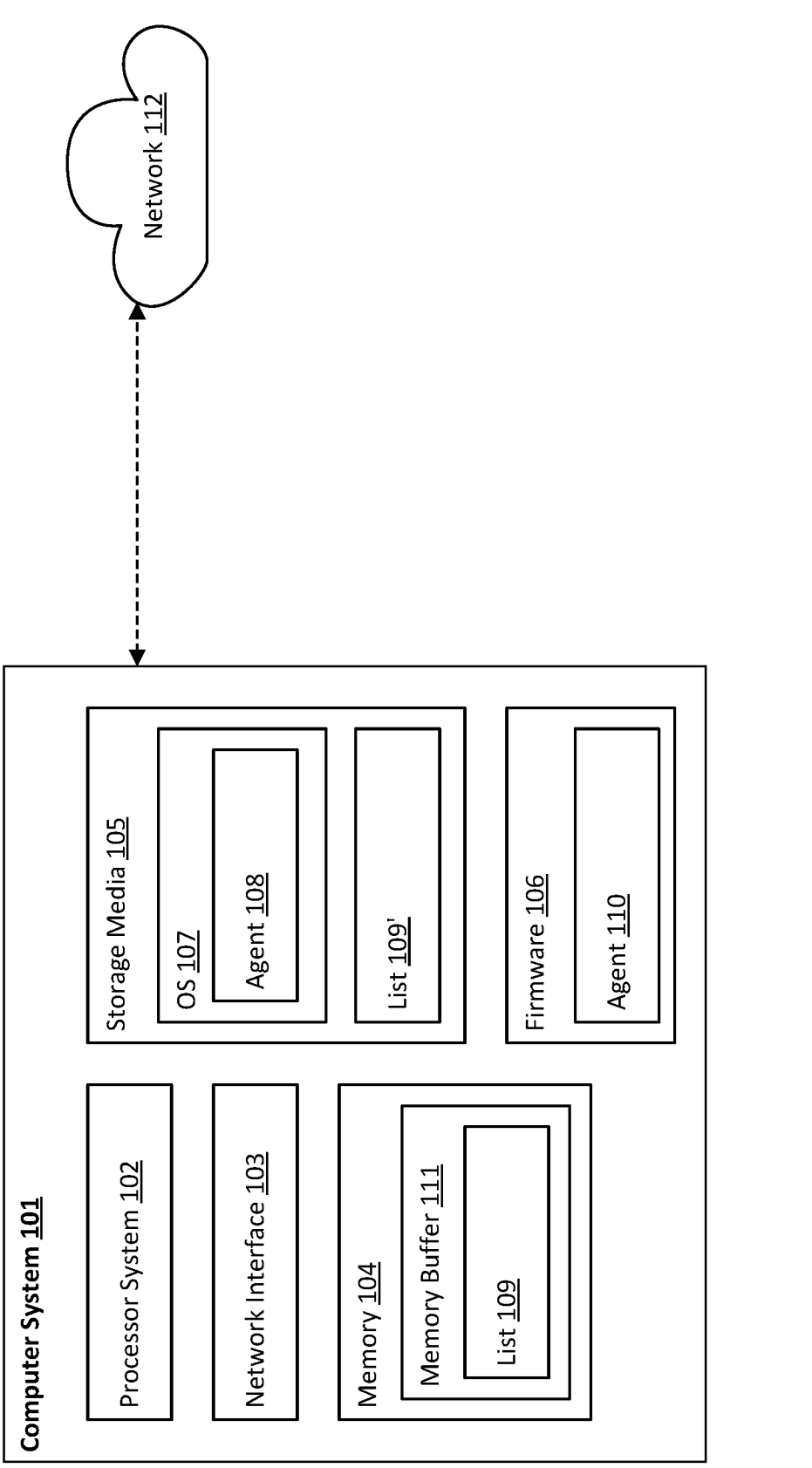
FIG. 1 illustrates an example of a computer architecture that facilitates tracking memory defects using a shared memory defect list.

Errors within memory, such as dynamic random-access memory (DRAM) components, threaten the stability of computing systems by corrupting data stored within the memory. Memory reliability features, some implemented by operating systems (OSs) and others implemented by system firmware, seek to protect computing systems against memory errors by creating and maintaining a store that describes the history of memory errors detected at a given device. For example, as memory errors are detected by an OS or system firmware (e.g., using error-correcting codes (ECC) or similar technology), the memory error information is saved by the OS or firmware. This store then enables the OS or system firmware to avoid using memory cells at which errors have occurred for the storage of data. Two examples of how stored memory error information can be used are Memory Predictive Failure Analysis (PFA) algorithms and Post Package Repair (PPR) solutions. PFA algorithms may use the stored error data to predict future errors and take preventative action. PPR solutions may use the stored error data to affect repairs on memory components using spare resources.

However, there are challenges with the longevity and accessibility of persisted memory error information. For example, an OS may persist memory error data in a durable store, such as a file on a filesystem. However, this error history is lost if the OS is reinstalled on a system unless processes are in place to transfer the data across to the new OS. Alternatively, system firmware may maintain and persist its own store of error data, but that data is accessible and usable only by the system firmware and not the OS. Thus, the system firmware may avoid the use of memory having errors, but the OS does not.

Disclosed embodiments address these issues by introducing a novel Shared Defect List (SDL) that includes memory error data that is cooperatively maintained by the OS and system firmware through standardized data formats and interfaces. By having a standardized format for the defect list, both the OS and the system firmware features are able to use the information contained therein for their respective features, applications, and uses. In embodiments, the SDL is persisted by system firmware in non-volatile storage (e.g., flash storage), and, therefore, the memory error data remains available across any OS installs.

In embodiments, firmware running in a computer system identifies a memory buffer (e.g., within system memory) at which to store an SDL that identifies the location(s) of any known defective memory. The firmware further provides an identification of the memory buffer to the OS also running in the computer system. In one example, this identification includes a base address of the memory buffer and the size of the memory buffer. Based on this identification, the OS accesses the SDL from the memory buffer and identifies any known defective memory from the SDL. The OS may manage memory locations used by the OS and applications executing thereon based on the identified defective memory by, for example, avoiding using the defective memory for the storage of data. In some embodiments, the firmware persists the contents of the memory buffer to non-volatile storage, such as flash storage, prior to shutting down the computer system. In embodiments, one or more of the firmware and the OS update the SDL when additional defective memory is identified.

FIG. 1 illustrates an example of a computer architecture 100 that facilitates tracking memory defects using a shared memory defect list. As shown, computer architecture 100 includes a computer system 101 comprising a processor system 102 (e.g., a single processor or a plurality of processors), a memory 104 (e.g., system or main memory), storage media 105 (e.g., a single computer-readable storage medium, or a plurality of computer-readable storage media), all interconnected by a bus (not shown). As shown, computer system 101 may also include a network interface 103 (e.g., one or more network interface cards) for interconnecting via network 112 to one or more other computer systems.

FIG. 1 illustrates memory 104 as including a memory buffer 111 storing a list 109. In embodiments, list 109 is an SDL that includes the location(s) of any known defective memory within memory 104. Additionally, FIG. 1 illustrates a storage media 105 as storing computer-executable instructions implementing an OS 107 that includes an agent 108 that participates in the use and management of list 109 by OS 107, and a firmware 106 as storing computer-executable instructions implementing an agent 110 that participates in the use and management of list 109 by firmware 106. In some embodiments, OS 107 and/or firmware 106 may each include multiple corresponding agents that each perform different functions or the same function in parallel.

In embodiments, agent 110 at firmware 106 determines the location and size of memory buffer 111 within memory 104, loads a prior SDL list (list 109') from persistent storage (e.g., flash storage) into memory buffer 111 (list 109), and provides information about memory buffer 111 (e.g., location, size) to OS 107. In some embodiments, agent 110 determines the location of memory buffer 111 based on a predetermined memory address, based on the size of memory 104, or based on some other metric. In some embodiments, agent 110 determines the size of memory buffer 111 based on a predetermined size, based on the size of memory 104, based on a size of list 109, or based on some other metric.

In embodiments, list 109 includes at least a location of a portion of memory within memory 104 that is defective. In various examples, physical memory defects could include individual bits, rows within a DRAM matrix, columns within the DRAM matrix, ranks, banks, and hardware components associated with addressing. List 109 can include entries identifying portions of defective memory corresponding to any of these types of physical memory defects. In some embodiments, the location of the portion of defective memory in list 109 is a bit range with an identified start point (e.g., covering one or more memory cells). In other embodiments, the location of the portion of defective memory in list 109 is a physical address of the portion of defective memory. In yet other embodiments, the location of the portion of defective memory in list 109 is an identifier of the defective memory that can be used to locate the defective memory. In some embodiments, list 109 may store other information (e.g., size, type, metadata) associated with the portion of defective memory. In some embodiments, the location of the defective memory is within memory 104, while in other embodiments, the location of the defective memory is within a memory other than memory 104.

While the format of list 109 can vary, in embodiments, list 109 comprises a header and a list of memory defects. In one example, a header comprises one or more of a signature (e.g., indicating the presence of an SDL), a version (e.g., a list version, an SDL format version), the length of the list, a count of the number of entries in the list, a checksum, and the like. In embodiments, each list entry identifies information about a type of memory error, valid bits for an address structure, a DIMM address, versioning, and the like. In one particular example, each list entry includes a union data structure, which in turn comprises one or more struct data structures defining one or more addresses (e.g., DDR4 address, DDR5 address), formatted as follows:

```
typedef union_DIMM_ADDRESS {
    //
    //DDR4 Address
    //
    struct {
        UINT64 SocketId: 4; //16 Sockets
        UINT64 MemoryControllerId: 2 //4 Memory Con-
            trollers
        UINT64 ChannelId: 2; //4 Channels
        UINT64 DimmSlot: 2; //3 DIMMs
        UINT64 DimmRank: 2; //4 Ranks
        UINT64 Device: 5; //18 Devices
        UINT64 ChipSelect: 3; //8 Chip IDs
        UINT64 Bank: 8; //16 Banks-includes BankGroup
            and Bank
        UINT64 Dq: 4; //16 DQs
        UINT64 Reserved: 32;
        UINT32 ROW;
        UINT32 Column;
        UINT64 Info;
    } Ddr4;
    //
    //DDR5 Address
    //
    struct {
        UINT64 SocketId: 5; //Up to 32 Sockets
        UINT64 MemoryControllerId: 4; //Up to 16
            Memory Controllers/Socket
```

UINT64 ChannelId: 3; //Up to 8 Channels/Memory
   Controller
UINT64 SubChannelId: 2; //4 Subchannels/Channel
UINT64 DimmSlot: 2; //Up to 4 DIMMs/(Subchan-
   nel/Channel)
UINT64 DimmRank: 4; //Up to 16 Electrical ranks/
   DIMM
UINT64 Device: 6; //Up to 64 Devices/Electrical
   rank
UINT64 ChipId: 4; //Up to 16 Chip IDs/DRAM
   Device
UINT64 Bank: 8; //256 Banks-includes BankGroup
   and Bank
UINT64 Dq: 5; //32 DQs
UINT64 Reserved: 21;
UINT32 Row; //Up to 18 Row Bits
UINT32 Column; //Up to 11 Column Bits
UINT64 Info;
   } Ddr5;
} DIMM_ADDRESS, *PDIMM_ADDRESS;

In embodiments, agent 110 at firmware 106 utilizes list 109 to manage memory usage by firmware 106. For example, agent 110 at firmware 106 ensures that firmware 106 does not utilize any memory locations indicated by list 109 for data storage. In embodiments, agent 110 may also manage list 109, such as to add one or more memory locations identified by firmware 106 as defective, to remove one or more memory locations from list 109 that are no longer identified as defective by firmware 106, etc.

In embodiments, prior to shutting down the computer system, agent 110 persists the contents of memory buffer 111 to non-volatile storage whose contents are retained even when computer system 101 is powered down, as indicated by list 109'. In some embodiments, list 109' is stored on the same non-volatile storage media as a storage media containing OS 107 (e.g., on an extensible firmware interface (EFI) system partition). In other embodiments, list 109' is stored on a different non-volatile storage media than the storage media containing OS 107 (e.g., a portion of flash storage). In either embodiment, list 109 is maintained and available even when OS 107 is reinstalled on computer system 101.

As indicated previously, in embodiments, agent 110 provides information about memory buffer 111 (e.g., location, size) to OS 107. In some embodiments, agent 110 provides this indication via a universal EFI (UEFI) variable. However, other mechanisms are possible, such as exposing a callable application programming interface (API) to OS 107, placing the information in a predetermined memory location, etc.

Based on agent 110 having provided information about memory buffer 111 (e.g., location, size) to OS 107, in embodiments, agent 108 at OS 107 identifies the information. The information associated with memory buffer 111 may include a base address, size, bit range, location, type, metadata, or other information associated with memory buffer 111. For example, agent 108 may identify the information from a UEFI variable indicated by agent 110, from a predetermined memory address, via an API call to firmware 106, etc.

Once it has identified memory buffer 111, agent 108 reads list 109 from memory buffer 111. As mentioned, each entry within list 109 includes the location(s) of defective memory within memory 104. As mentioned above, list 109 may include each location as a range, a physical address, or an identifier. In embodiments, agent 108 identifies a chunk of memory, such as a memory page, containing each portion of defective memory and treats that entire chunk as defective. In embodiments, OS 107 manages which memory locations within memory 104 that OS 107 and/or applications executing thereon use for data storage based on the memory identified by agent 108 as defective.

In embodiments, agent 108 may identify one or more additional portions of memory as defective and add them to list 109 accordingly. Additionally, or alternatively, agent 108 may identify one or more portions of memory as no longer defective and remove them from list 109 accordingly. In embodiments, agent 108 may request that firmware flush list 109 to non-volatile storage, and, in response, agent 108 persists list 109 to storage media 105 (e.g., list 109'). In embodiments, OS 107 may request a system reboot or shutdown, and, in response, agent 108 persists list 109 to storage media 105 (e.g., list 109').

Figure 2A:
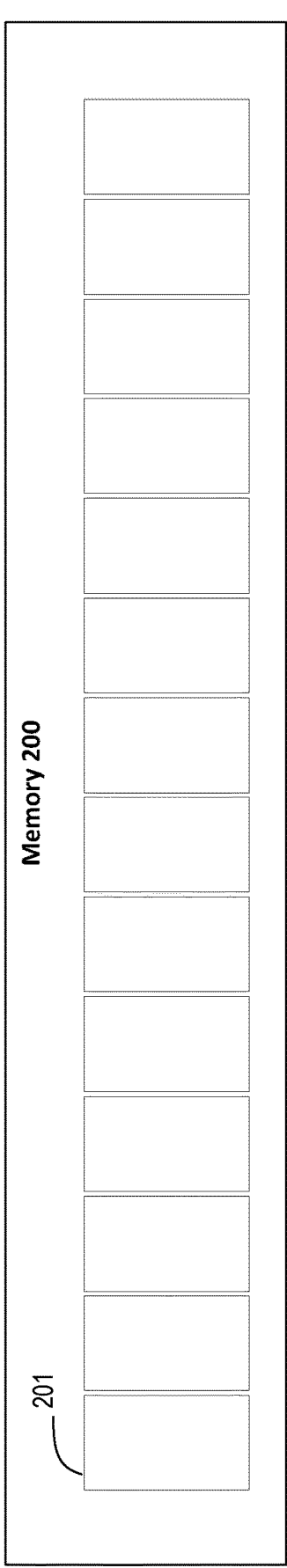
FIGS. 2A-2C illustrate an example of the system identifying, managing, and updating defective memory.
Figure 2B:
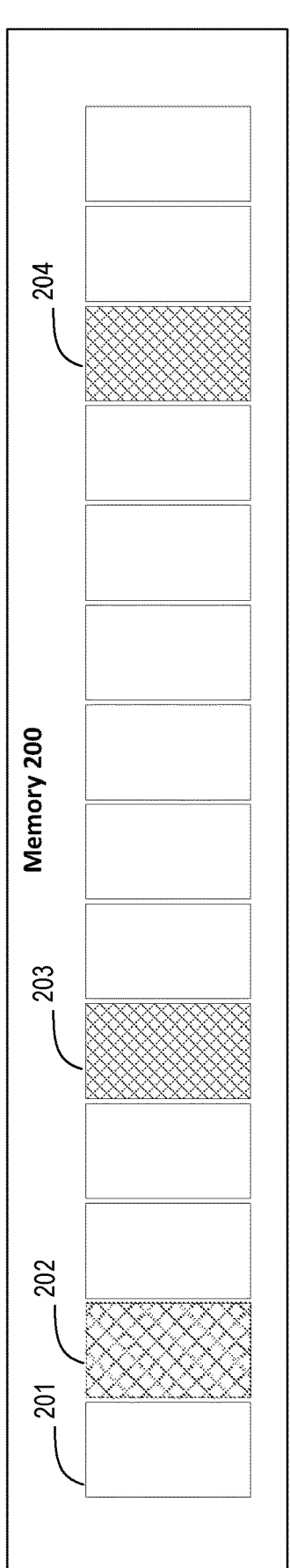
Figure 2C:
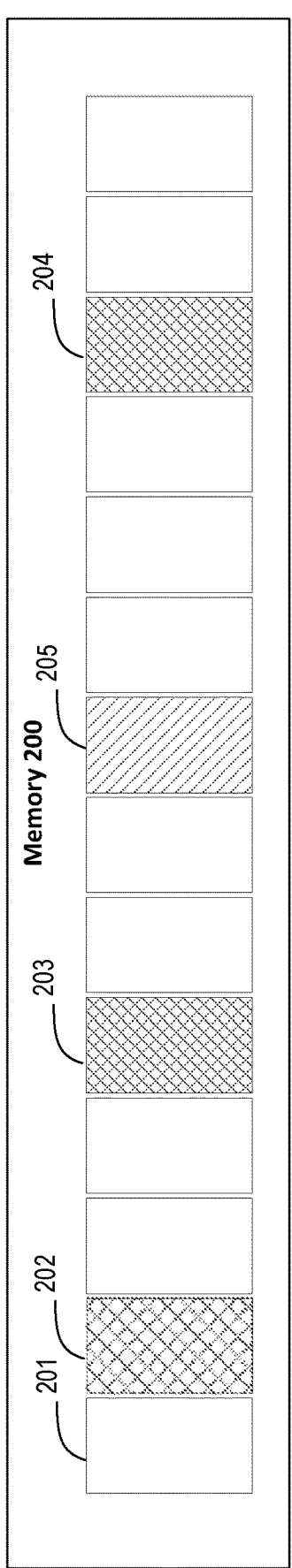

FIGS. 2A-2C illustrate an example of identifying and adding portions of defective memory within memory 200 within a computer system. Turning first to FIG. 2A, illustrated is an example memory 200 (e.g., memory 104) within a computer system (e.g., computer system 101) when an OS (e.g., OS 107) at the computer system is first. Initially, the OS identifies is aware of no defects in memory 200, as shown reflected in FIG. 2A.

A firmware (e.g., firmware 106) provides an identification of memory buffer 201 that stores an SDL (e.g., list 109). The SDL contained in memory buffer 201 includes location information of portions of memory within memory 200 previously identified as defective. In some embodiments, the firmware sends the identification of memory buffer 201 to the OS through a UEFI variable.

Based on the firmware providing the identification of memory buffer 201 to the OS, the OS identifies information associated with memory buffer 201, such as a base address and size of memory buffer 201. Further, the OS reads an SDL found in memory buffer 201, including locations of portions of defective memory within memory 200. In embodiments, the OS further identifies the portions of defective memory based on the list found in memory buffer 201.

In some embodiments, the list found in memory buffer 201 includes one or more entries, each specifying a range (e.g., one or more bits) of defective memory. For instance, these entries may identify individual bits, rows within a DRAM matrix, columns within the DRAM matrix, ranks, banks, etc. In embodiments, based on one or more entries, the OS identifies a physical address(es) of one or more portions of defective memory. In some embodiments, based on these address(es) the OS identifies one or more chunks of memory, such as one or more memory pages, that are considered defective and to be avoided for the storage of data.

FIG. 2B illustrates memory 200 once the OS has identified the portions of defective memory (e.g., portion 202, portion 203, and portion 204). Once the portions of defective memory are identified, the OS manages the memory locations used and specifically avoids using portion 202, portion 203, and portion 204 of defective memory in memory 200. Additionally, or alternatively, the firmware also manages memory locations used and avoids using portion 202, portion 203, or portion 204 of defective memory in memory 200.

FIG. 2C illustrates an example of identifying additional defective memory. In embodiments, the OS or the firmware running in the computer system determines that a portion 205 of memory is newly identified as being defective. In embodiments, once portion 205 of memory is identified as defective by OS 107 (e.g., agent 110) and/or firmware 106 (e.g., agent 108), portion 205 is added to the list found in memory buffer 201 (e.g., by agent 110 or agent 108). In some embodiments, the OS and/or the firmware may additionally, or alternatively, identify a portion of memory that is no longer defective and remove it from the list.

Once portion 205 of defective memory is added to the list, in some embodiments, the OS sends a request to the firmware to flush the list. In response to the request, the firmware flushes the list to non-volatile storage. Once the contents of memory buffer 201 are persisted to non-volatile storage by the firmware, the computer system can be shut down, or an OS can be reinstalled/installed.

As now shown in FIG. 2C, after the addition of the portion 205 of defective memory, memory 200 now has portion 202, portion 203, portion 204, and portion 205 identified as defective. The list located in memory buffer 201 is updated to identify the location of the defective memory portions, and the contents of memory buffer 201 are persisted in non-volatile memory (e.g., storage media 105).

While the example of FIGS. 2A-2C demonstrates OS 107 discovering memory defects and updating an SDL, in additional or alternative embodiments firmware 106 discovers memory defects and updates the SDL. For example, during system boot firmware 106 runs memory diagnostics, identifies defects, and updates the SDL.

Notably, the embodiments herein provide a variety of benefits beyond sharing using the embodiments described herein. For example, because the SDL exists independently of an OS, in some cases an SDL can come pre-populated from manufacturing/qualification. For example, a manufacturer can test a computer system for memory defects and populate an SDL. This would permit an OS to exclude pages of memory that contain defects on first boot, ensuring that the user/consumer never encounters those defects.

In addition, using the embodiments described herein, defective memory components (e.g., bad DIMMs) can be identified even if a computer system cannot boot an OS. Any alternative environment (e.g., a UEFI shell, a minimal OS that can boot from a USB key) can be used to harvest the SDL information and identify which components may need to be serviced.

Furthermore, using the embodiments described herein, a single SDL can be utilized by multiple OSs in a multi-boot environment. In this case, the SDL can contain defects discovered by each OS, so all OSes in the multi-boot environment benefit.

Embodiments are now described in connection with FIG. 3, which illustrates a flow chart of an example method 300 for tracking memory defects using a shared memory defect list. In embodiments, instructions for implementing method 300 are encoded as computer-executable instructions by either firmware 106 or OS 107 that are executable by a processor (e.g., processor system 102) to cause a computer system (e.g., computer system 101) to perform method 300.

The following discussion now refers to a method and method acts. Although the method acts are discussed in specific orders or are illustrated in a flow chart as occurring in a particular order, no order is required unless expressly stated or required because an act is dependent on another act being completed prior to the act being performed.

Figure 3:
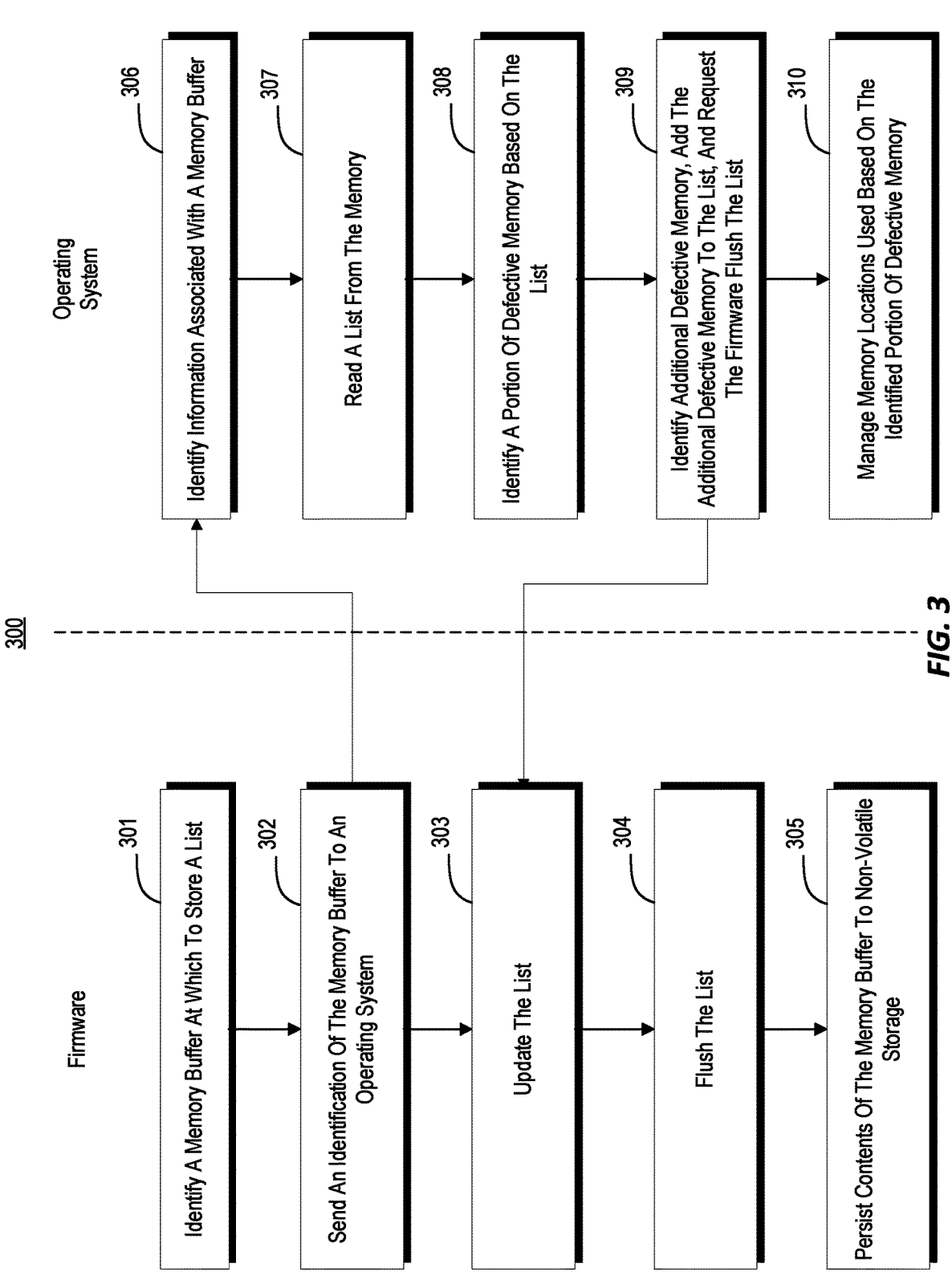
FIG. 3 illustrates a flow chart of an example of a method for tracking memory defects using a shared memory list.

Referring to FIG. 3, in embodiments, method 300 comprises acts 301-305 from the perspective of firmware (e.g., firmware 106), while acts 306-310 are from the perspective of an OS (e.g., OS 107).

In some embodiments, act 301 comprises, from the perspective of the firmware (e.g., firmware 106), identifying a memory buffer (e.g., memory buffer 111) at which to store a list (e.g., list 109). In some embodiments, act 301 comprises identifying, by an agent, a memory buffer at which to store a list. The list includes one or more entries, each specifying a portion of memory that has been identified as defective. For example, an agent (e.g., agent 110) running in the firmware (e.g., firmware 106) can identify a memory buffer within the memory (e.g., memory 104) to store a defect list (e.g., list 109). The list includes the locations of one or more portions of memory within the memory that are defective (e.g., portion 202, portion 203, and portion 204). In some embodiments, the location of the portion of defective memory is within the memory (e.g., memory 104).

Method 300 also comprises act 302, from the perspective of the firmware (e.g., firmware 106), of sending an identification of the memory buffer to an operating system (e.g., OS 107). In some embodiments, act 302 comprises sending, by an agent, an identification of the memory buffer to an operating system of the computer system. For example, the agent (e.g., agent 110) running in the firmware (e.g., firmware 106) can send the identification of the memory buffer (e.g., 114) to the OS (e.g., OS 107). In some embodiments, the agent sends the identification of the memory buffer to the OS through a UEFI variable.

Method 300 also comprises act 303, from the perspective of the firmware (e.g., firmware 106), of updating the list. In some embodiments, act 303 comprises updating the list by adding an entry to the list identifying an additional portion of defective memory, removing an entry from the list, modifying an entry in the list (e.g., to indicate that the portion of memory is no longer defective), and the like. For example, in some embodiments, the firmware (e.g., firmware 106) adds additional defective memory (e.g., portion 205) to the list (e.g., list 109) found in the memory buffer. In other embodiments, the firmware (e.g., firmware 106) removes defective memory (e.g., portion 202) from the list (e.g., list 109) found in the memory buffer.

Method 300 also comprises act 304, from the perspective of the firmware (e.g., firmware 106), of flushing the list. In some embodiments, act 304 comprises receiving a request from the operating system to flush the list and flushing the list based on the request. For example, the OS (e.g., OS 107) sends a request to the firmware (e.g., firmware 106) to flush the list (e.g., list 109) to non-volatile storage (e.g., storage media 105).

Method 300 also comprises act 305, from the perspective of the firmware (e.g., firmware 106), of persisting contents of the memory buffer to non-volatile storage. In some embodiments, act 305 comprises, prior to shutting down the computer system, persisting contents of the memory buffer to non-volatile storage. For example, the firmware (e.g., firmware 106) persists the contents of the memory buffer (e.g., memory buffer 111) including the list (e.g., list 109) to non-volatile storage (e.g., storage media 105) prior to shutting down the system (e.g., computer system 101). In some embodiments, the firmware further shuts down the computer system.

Method 300 also comprises act 306, from the perspective of the operating system (e.g., OS 107), of identifying information associated with a memory buffer. In some embodiments, act 306 comprises identifying information associated with a memory buffer. The information includes a base address of the memory buffer and a size of the memory buffer. In some embodiments, the OS receives a universal extensible firmware interface (UEFI) variable from a firmware running in the computer system and the UEFI variable includes the identification of the memory buffer. For example, the OS (e.g., OS 107) identifies information associated with the memory buffer (e.g., memory buffer 111) such as location and size. In some embodiments, the firmware (e.g., firmware 106) sends the identification to the OS (e.g., OS 107) using a UEFI variable that includes the identification of the memory buffer (e.g., memory buffer 111).

Method 300 also comprises act 307, from the perspective of the operating system (e.g., OS 107), of reading a list from the memory. In some embodiments, act 307 comprises reading a list from memory where each entry on the list identifies a location of a portion of defective memory within the memory. For example, the list (e.g., list 109) stored in the memory buffer (e.g., memory buffer 201) identifies a location of a portion of defective memory (e.g., portion 202, portion 203, or portion 204) within the memory (e.g., memory 200).

Method 300 also comprises act 308, from the perspective of the operating system (e.g., OS 107), of identifying a portion of defective memory based on the list. In some embodiments, act 308 comprises identifying the portion of defective memory based on the list. For example, the list (e.g., list 109) stored in the memory buffer (e.g., memory buffer 201) identifies a location of a portion of defective memory (e.g., portion 202, portion 203, or portion 204) within the memory (e.g., memory 200). In some embodiments, the OS (e.g., OS 107) further identifies a physical address of the portion of defective memory. In some embodiments, the physical address corresponds to a chunk of memory, and the chunk of memory is a memory page.

Method 300 also comprises act 309, from the perspective of the operating system (e.g., OS 107), of identifying additional defective memory, adding the additional defective memory to the list, and requesting the firmware flush the list. In some embodiments, act 309 comprises identifying an additional portion of memory as defective, adding the additional portion of memory to the list, and sending a request to a firmware to flush the list to non-volatile storage. For example, the OS (e.g., OS 107) identifies additional defective memory (e.g., portion 205) within the memory (e.g., memory 200). In embodiments, the OS (e.g., OS 107) adds the portion of defective memory (e.g., portion 205) to the list (e.g., list 109) in the memory buffer (e.g., memory buffer 201). The OS (e.g., OS 107) then sends a request to the firmware (e.g., firmware 106) to flush the list (e.g., list 109) to non-volatile storage (e.g., storage media 105).

Method 300 also comprises act 310, from the perspective of the operating system (e.g., OS 107), of managing memory locations used based on the identified portion of defective memory. In some embodiments, act 310 comprises managing memory locations used by the operating system based on the identified portion of defective memory, including avoiding the use of the portion of defective memory. For example, the OS (e.g., OS 107) manages using the memory (e.g., memory 200) and avoids using the portions of defective memory (e.g., portion 202, portion 203, and portion 204).

As mentioned above, some embodiments, from the perspective of firmware (e.g., firmware 106), comprise acts 301-305. In these embodiments, a method comprises identifying a memory buffer at which to store a list (act 301), sending an identification of the memory buffer to an operating system (act 302), updating the list, flushing the list, and persisting contents of the memory buffer to non-volatile storage (act 305).

Other embodiments, from the perspective of an OS (e.g., OS 107), comprise acts 306-310. In these embodiments, a method comprises identifying information associated with a memory buffer (act 306); reading a list from the memory (act 307); identifying a portion of defective memory based on the list (act 308); identifying additional defective memory, adding the additional defective memory to the list, and requesting the firmware flush the list (act 309); and managing memory locations used based on the identified portion of defective memory (act 310).

Embodiments of the disclosure comprise or utilize a special-purpose or general-purpose computer system (e.g., computer system 101) that includes computer hardware, such as, for example, a processor system (e.g., processor system 102) and system memory (e.g., memory 104), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage media 105). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 103) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more virtual machines (VMs). During operation, VMs emulate an operational computing system, supporting an operating system (OS) and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes that come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method implemented in firmware running in a computer system that includes a processor system, a non-volatile storage, and a memory, comprising:
   identifying a memory buffer within the memory at which to store a list, wherein the list includes a first entry identifying a first portion of the memory that is defective;
   sending an identification of the memory buffer to an operating system of the computer system, the operating system being configured to read the list from the memory buffer and to manage memory usage to avoid the first portion of the memory that is defective;
   receiving a first request from the operating system to flush the list;
   in response to the first request, writing contents of the list from the memory buffer to the non-volatile storage;
   detecting a second request from the operating system to shut down the computer system; and
   prior to shutting down the computer system, persisting contents of the memory buffer, including the list, to the non-volatile storage.

2. The method of claim 1, wherein sending the identification of the memory buffer to the operating system comprises setting a universal extensible firmware interface (UEFI) variable.

3. The method of claim 1, further comprising adding a second entry to the list identifying a second portion of memory that is defective.

4. The method of claim 1, further comprising removing the first entry from the list.

5. The method of claim 1, further comprising updating the first entry to indicate that the first portion of memory is no longer defective.

6. The method of claim 1, further comprising managing memory locations used by the firmware based on the list, including avoiding use of the first portion of memory.

7. The method of claim 1, further comprising shutting down the computer system.

8. The method of claim 1, wherein the first portion of memory comprises one or more bits of memory.

9. A method implemented in an operating system running in a computer system that includes a processor system and a memory, comprising:

identifying information associated with a memory buffer, wherein, the information includes a base address of the memory buffer and a size of the memory buffer; and the information is received from a firmware running on the computer system;

reading a list from the memory, wherein each entry on the list identifies a location of a portion of defective memory within the memory;

identifying a first portion of defective memory based on the list;

managing memory locations used by the operating system based on the identified portion of defective memory, including avoiding use of the first portion of defective memory;

identifying a second portion of the memory as defective;

adding an entry to the list identifying the second portion of the memory as defective;

sending a first request to the firmware to flush the list; and sending a second request to the firmware to shut down the computer system, and wherein the firmware persists contents of the memory buffer, including the list, to a non-volatile storage prior to shutting down the computer system.

10. The method of claim 9, further comprising identifying a physical address of the portion of defective memory.

11. The method of claim 10, wherein the physical address corresponds to a chunk of memory.

12. The method of claim 11, wherein the chunk of memory is a memory page.

13. The method of claim 9, further comprising receiving a universal extensible firmware interface (UEFI) variable from a firmware running in the computer system.

14. The method of claim 13, wherein the UEFI variable includes an identification of the memory buffer.

15. A computer system, comprising:

a processor system;

a memory;

a firmware running in the computer system;

an operating system running in the computer system; and a computer storage medium that stores, first computer-executable instructions that are executable by the processor system to cause the firmware to at least:

identify a memory buffer at which to store a list, wherein the list includes an entry identifying a first portion of the memory as defective;

send an identification of the memory buffer to the operating system;

identify a first request from the operating system to flush the list;

in response to the first request, writing contents of the list from the memory buffer to a non-volatile storage;

identify a second request from the operating system to shut down the computer system; and prior to shutting down the computer system, persist contents of the memory buffer to the non-volatile storage; and second computer-executable instructions that are executable by the processor system to cause the operating system to at least:

identify information associated with the memory buffer, wherein, the information includes a base address of the memory buffer and a size of the memory buffer; and the information is received from the firmware;

read the list from the memory, wherein each entry on the list identifies a different portion of the memory as defective;

identify the first portion of memory as defective based on the list;

manage memory locations used by the operating system based on the identified portion of defective memory, including avoiding use of the first portion of memory;

identify a second portion of the memory as defective;

add an entry to the list identifying the second portion of the memory as defective;

send the first request to the firmware to flush the list; and send the second request to the firmware to shut down the computer system.

16. The computer system of claim 15, wherein sending the identification of the memory buffer to the operating system comprises setting a universal extensible firmware interface (UEFI) variable, the UEFI variable including an identification of the memory buffer.

17. The computer system of claim 15, wherein the second computer-executable instructions are also executable by the processor system to receive a universal extensible firmware interface (UEFI) variable from the firmware, the UEFI variable including an identification of the memory buffer.

18. The computer system of claim 15, wherein the second computer-executable instructions are also executable by the processor system to identify a physical address of the first portion of memory.

19. The computer system of claim 18, wherein the physical address corresponds to a memory page.

20. The computer system of claim 15, wherein the first computer-executable instructions are also executable by the processor system to manage memory locations used by the firmware based on the list, including avoiding use of the first portion of memory.

* * * * *